United States Patent [19]
Brunner et al.

[11] Patent Number: 5,771,275
[45] Date of Patent: Jun. 23, 1998

[54] USE OF ISDN TO PROVIDE WIRELESS OFFICE ENVIRONMENT CONNECTION TO THE PUBLIC LAND MOBILE NETWORK

[75] Inventors: Richard Brunner; Roch Glitho, both of Montreal, Canada

[73] Assignee: Telefonaktiebolaget LM Ericsson, Stockholm, Sweden

[21] Appl. No.: 766,141

[22] Filed: Dec. 17, 1996

[51] Int. Cl.$^6$ .............................. H04M 11/00; H04M 1/64
[52] U.S. Cl. ................................ 379/67; 379/58; 379/59; 379/60; 379/67; 379/88; 379/89
[58] Field of Search ................................. 379/67, 88, 89, 379/58, 59, 60

[56] References Cited

U.S. PATENT DOCUMENTS

| | | | |
|---|---|---|---|
| 4,893,327 | 1/1990 | Stern et al. ................................. | 379/59 |
| 4,955,050 | 9/1990 | Yamauchi ................................. | 379/59 |
| 5,040,177 | 8/1991 | Martin et al. ............................. | 370/110 |
| 5,133,001 | 7/1992 | Böhm ........................................ | 379/58 |
| 5,259,017 | 11/1993 | Langmantel ............................... | 379/58 |
| 5,325,419 | 6/1994 | Connolly et al. .......................... | 379/60 |
| 5,355,402 | 10/1994 | Weis et al. ................................ | 379/61 |
| 5,402,470 | 3/1995 | Devaney .................................... | 379/59 |
| 5,440,613 | 8/1995 | Fuentes ..................................... | 379/60 |
| 5,440,614 | 8/1995 | Sonberg et al. .......................... | 379/60 |
| 5,446,736 | 8/1995 | Gleeson et al. .......................... | 370/85 |
| 5,448,619 | 9/1995 | Evans et al. .............................. | 379/58 |
| 5,519,697 | 5/1996 | Fujita et al. ............................. | 370/58.3 |

*Primary Examiner*—Harry S. Hong
*Assistant Examiner*—Allan Hoosain
*Attorney, Agent, or Firm*—Jenkens & Gilchrist, P.C.

[57] ABSTRACT

An integrated services digital network (ISDN) connection is maintained between a wireless office environment type private cellular telephone system and a public access cellular telephone system. In particular, an mB+D ISDN connection (where m=2, 23 or 30) is maintained between the ISDN network and each of a wireless office environment mobile switching center (WOE-MSC), a public land mobile network mobile switching center (PLMN-MSC) and a home location register (PLNN-HLR). A protocol converter is provided in each of these nodes to convert between the Transaction Capabilities Application Part (TCAP) message Signaling Connection Control Part (SCCP) supported signaling system no. 7 (SS7) message formats and the ISDN format. During registration, call delivery and hand off, an ISDN call communication is established between the wireless office environment type private cellular telephone system and the public access cellular telephone system. The SS7 messages are then exchanged between the systems over the D channel. Any necessary speech connection is then carried over one of the m available B channels.

25 Claims, 6 Drawing Sheets

USE OF ISDN TO PROVIDE WIRELESS OFFICE ENVIRONMENT CONNECTION TO THE PUBLIC LAND MOBILE NETWORK

BACKGROUND OF THE INVENTION

1. Technical Field of the Invention

The present invention relates to wireless office environments as well as to public land mobile networks and, in particular, to the interconnection of a wireless office environment and a public land mobile network via an integrated services digital network (ISDN).

2. Description of Related Art

Public access cellular telephone systems are currently available for use throughout the world. In part as a result of the success of such systems in providing mobile telecommunications services to the public, considerable interest has arisen in the corporate sector to providing a wireless communications feature add-on to conventional private wireline telephone systems. Such a feature is typically implemented through the use of a private cellular telephone system.

Due to the cost of mobile terminals, it is preferable that any private cellular telephone system established by a business utilize the same types of mobile terminals as are used with public access cellular telephone systems and are readily available. Furthermore, because many employees already own mobile terminals and have subscriptions with a public access cellular telephone system, it is preferable that the utilized mobile stations be capable of operating within and between each of the systems. At a minimum, this requires that the private cellular telephone system operate within the same cellular frequency band as the public access cellular telephone system, and use the same type ox compatible switching equipment and base stations. It is also likely that the radio frequency coverage regions of the private cellular telephone system and the public access cellular telephone system may at least partially overlap. Furthermore, the private cellular telephone system and the public access cellular telephone system must communicate with each other regarding the servicing of mobile stations, the allocation of channels (frequencies) for communication, the routing of communications, and the handing off of mobile station communications.

To convey TIA/EIA Interim Standard IS-41 (as well as other signaling system no. 7) messaging, a permanent pulse code modulated E1/T1 connection is typically used to connect between the private cellular telephone system and the public access cellular telephone system. The cost of implementing this connection is typically borne by the provider of the private cellular telephone system. For private cellular telephone system providers having many employees, the five to ten thousand dollar per year charge for the E1/T1 connection is both reasonable and acceptable. For private cellular telephone system providers with few employees, often referred to as implementing a "wireless office environment" (WOE), the cost of maintaining the E1/T1 connection to the public access cellular telephone system cannot be justified.

Accordingly, there is a need for a more economical connection mechanism between a wireless office environment type private cellular telephone system and the public access cellular telephone system. Furthermore, to support inter-operability, there is a need to utilize the more economical connection for effectuating the hand off of communications between the wireless office environment type private cellular telephone system and the public access cellular telephone system, the registration of mobile stations operating therein, and the delivery of calls to such mobile stations.

SUMMARY OF THE INVENTION

To address the foregoing needs, the present invention utilizes an integrated services digital network (ISDN) connection between a wireless office environment type private cellular telephone system and a public access cellular telephone system. Such a connection may be obtained by the service provider at much less expense than an E1/T1 connection. An mB+D ISDN connection (wherein m=2, 23 or 30) is maintained between a wireless office environment mobile switching center (WOE-MSC) and both a public land mobile network mobile switching center (PLMN-MSC) and its home location register (PLMN-HLR).

As the mB+D ISDN connection does not support the transmission of TIA/EIA Interim Standard IS-41 (as well as other signaling system no. 7—SS7) messages, a protocol converter is provided in the wireless office environment mobile switching center, public land mobile network mobile switching center, and public land mobile network home location register to convert between the Transaction Capabilities Application Part (TCAP) message format of the IS-41 (and other SS7) messages and the ISDN format. In particular, the protocol converter emulates the primitives offered by the Signaling Connection Control Part (SCCP) and functions to encapsulate TCAP messages within ISDN packets for transmission over the mB+D ISDN connection. Upon reception, a corresponding protocol converter deencapsulates TCAP messages from the received ISDN packets for processing. The protocol converters accordingly allow the mB+D ISDN connection to behave like the Message Transfer Part (MTP) with respect to the transmission of IS-41 (and other SS7) messages.

When a need arises to hand off a communication between the wireless office environment type private cellular telephone system and the public access cellular telephone system, register a mobile station or perform a call delivery, an ISDN call is initiated from the mobile switching center of one system to the mobile switching center of the other system using the mB+D ISDN connection. The requisite IS-41 (and other SS7) messages are then exchanged over the D channel to perform the designated function. Any requisite speech connection in relation to that function is carried over one of the m available B channels.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
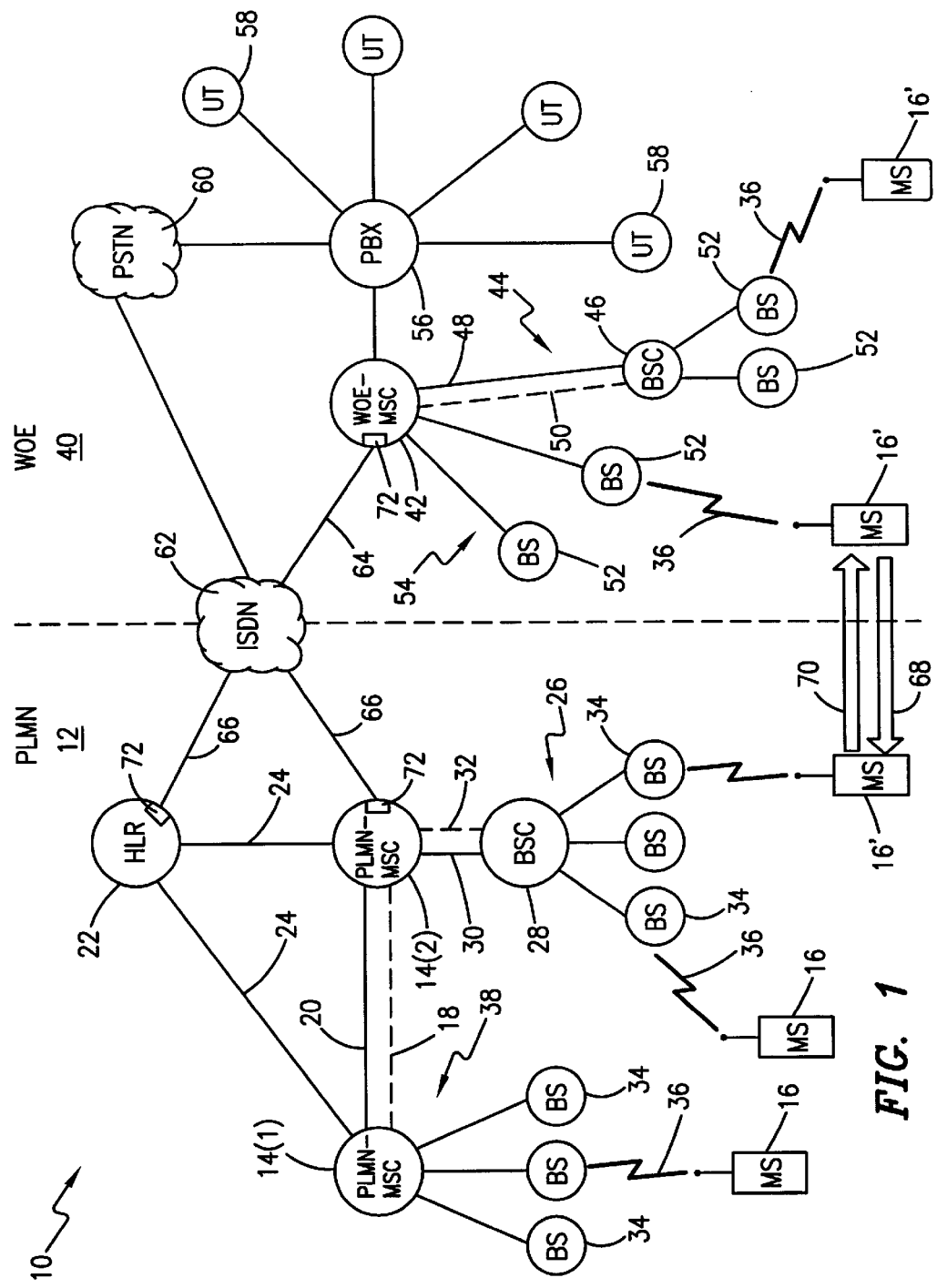
FIG. 1 is a schematic diagram of a wireless communications system including a wireless office environment type private cellular telephone system and a public access cellular telephone system.

Reference is now made to FIG. 1 wherein there is shown a schematic diagram of a wireless communications system 10 including a public access cellular telephone system 12 (such as a known public land mobile network PLMN). The public access cellular telephone system 12 includes a plurality of interconnected switching nodes 14 commonly referred to as mobile switching centers (PLMN-MSCS). Although only two mobile switching centers 14 are shown, it will be understood that the system 12 likely includes many more interconnected nodes. The first and second mobile switching centers 14(1) and 14(2) may comprise any one of a number of known telecommunications switching devices, including those commonly used and known in the art for providing either digital or analog cellular telephone service to a plurality of mobile stations (MS) 16. The mobile switching centers 14 are interconnected with each other for communication via both voice trunks 18 (illustrated with broken lines) and signaling links 20 (illustrated with solid lines) together providing a known ISUP (or R1 or R2) type connection. The voice trunks 18 provide voice and data communications paths used to carry subscriber communications between the mobile switching centers 14. The signaling links 20 carry command signals (such as IS-41 or other signaling system no. 7 SS7 messages) between the mobile switching centers 14. These signals may be used, for example, in setting up and tearing down voice and data communications links over the voice trunks 18 and controlling the provision of calling services to the mobile stations 16. The mobile switching centers 14 are also connected to a data base 22 comprising a home location register (PLMN-HLR) by means of signaling links 24 providing a known IS-41 (or other SS7) type connection. The data base 22 stores information concerning the mobile stations 16 comprising location information and service information.

In one cellular system implementation, illustrated generally at 26, the mobile switching center 14 is further connected to at least one associated base station controller (BSC) 28 via both a signaling link 30 and a voice trunk 32. Only one base station controller 28 is shown connected to mobile switching center 14(2) in order to simplify the illustration. The voice trunk 32 provides a voice and data communications path used to carry subscriber communications between the second mobile switching center 14(2) and its base station controller 28. The signaling link 30 carries command signals (such as SS7 messages) between the node 14 and its associated base station controller 28. The signaling link 30 and trunk 32 are collectively commonly referred to in the art as the "A interface". The base station controller 28 is then connected to a plurality of base stations (BS) 34 which operate to effectuate radio frequency communications with proximately located mobile stations 16 over an air interface 36. The base station controller 28 functions in a well known manner to control this radio frequency communications operation.

In another cellular system implementation, illustrate generally at 38, the mobile switching center 14(1) is further connected to a plurality of base stations (BS) 34 which operate to effectuate radio frequency communications with proximately located mobile stations 16 over the air interface 36. In this implementation, the functionality provided by the base station controller 28 (see, generally at 26) is instead provided by the mobile switching center 14.

Although direct communications links (signaling and/or trunk) are illustrated for the system 12 of FIG. 1, it is understood by those skilled in the art that the links are not necessarily direct between the illustrated nodes, and may instead pass through many other communications nodes (not shown) of the mobile network, and perhaps even utilize other communications networks (such as the public switched telephone network—PSTN). Illustration of the links in the manner shown in FIG. 1 is therefore by way of simplification of the drawing.

The wireless communications system 10 further includes a wireless office environment type private cellular telephone system 40. A switching node 42, commonly referred to as a mobile switching center (WOE-MSC), is included in the system 40. The mobile switching center 42 may comprise any one of a number of known telecommunications switching devices, including those commonly used and known in the art for providing either digital or analog cellular telephone service to a plurality of mobile stations (MS) 16'.

In a first implementation, illustrated generally a 44, the mobile switching center 42 is connected to at leas one associated base station controller (BSC) 46 via both a signaling link 48 and a voice trunk 50. Only one base station controller 46 is shown connected to mobile switching center 42 in order to simplify the illustration. The voice trunk 50 provides a voice and data communications path used to carry subscriber communications between the mobile switching center 42 and its base station controller 46. The signaling link 48 carries command signals (such as SS7 messages) between the node 42 and its associated base station controller 46. The signaling link 48 and trunk 50 are collectively commonly referred to in the art as the "A interface". The base station controller 46 is then connected to a plurality of base stations (BS) 52 which operate to effectuate radio frequency communications with proximately located mobile stations 16' over the air interface 36. The base station controller 46 functions in a well known manner to control this radio frequency communications operation.

In an alternative implementation, illustrate generally at 54, the mobile switching center 42 is connected to a plurality of base stations (BS) 52 which operate to effectuate radio frequency communications with proximately located mobile stations 16' over the air interface 36. In this implementation, the functionality provided by the base station controller 46 (see, generally at 44) is instead provided by the mobile switching center 42.

The system 40 further includes a private branch exchange (PBX) 56 connected to the mobile switching center 42 and operable to provide wireline telephone service to a plurality of user terminals (UTs) 58. The private branch exchange 56 functions in a well known manner to allow one user terminal 58 to contact another user terminal through the dialing of an extension number. The private branch exchange 56 further functions to deliver incoming calls from the public switched telephone network (PSTN) 60 to a particular user terminal 58 (perhaps through the use of direct inward dialing or through operator assistance). The private branch exchange 56 further functions to allow a user terminal 58 to initiate a call to the public switched telephone network 60 (perhaps through the use of direct outward dialing or through operator assistance). The configuration of a private branch exchange (PBX) 56 to perform the foregoing telecommunications services is well known to those skilled in the art.

The public access cellular telephone system 12 and the wireless office environment type private cellular telephone system 40 are interconnected through an integrated services digital network (ISDN) 62 (rather than a conventional E1/T1 connection as in the prior art). The connection of the wireless office environment type private cellular telephone system 40 to the integrated services digital network 62 is made from the mobile switching center (WOE-MSC) 42 using a basic rate access 2B+D ISDN connection 64. The connection of the integrated services digital network 62 to a cooperating mobile switching center 14(2) (PLMN-MSC) of the public access cellular telephone system 12 is made by using either a basic rate access 2B+D or primary rate access nB+D ISDN connection 66 (where n=23 or 30). Similarly, the connection of the integrated services digital network 62 to the data base (PLMN-HLR) 22 of the public access cellular telephone system 12 is made by using either a basic rate access 2B+D or primary rate access nB+D ISDN connection 66 (where n=23 or 30). The choice of basic or primary rate access for the ISDN connection 66 between the integrated services digital network 62 and the public access cellular telephone system 12 depends on the number of wireless office environment type private cellular telephone systems 40 which share radio frequency communications coverage (in whole or in part) with the public access cellular telephone system. The integrated services digital network 62 is further connected to, or more particularly comprises a part of, the public switched telephone network 60.

In operation, the wireless office environment type private cellular telephone system 40 provides wireless cellular communications services only to the mobile stations 16'. In order to maintain the "private" aspect of system 40 operation, mobile stations 16 not authorized for communication are denied access to the wireless office environment type private cellular telephone system. However, some if not all of the mobile stations 16' may have cellular service subscriptions allowing for access to the public access cellular telephone system 12. Thus, mobile stations 16' may be capable of and authorized for operation in both systems.

Because the mobile stations 16' are by definition "mobile", instances will arise where their owning subscribers may move between the service area of the public access cellular telephone system 12 and the service area of the wireless office environment type private cellular telephone system 40. When in idle mode, the mobile stations 16' simply engage in server selection as is well known to those skilled in the art to choose the most appropriate base station 34 or 52 with which to communicate. When engaged in a call communication, however, movement of the mobile station 16' may result in a need to perform an inter-exchange hand off OF the ongoing communication. For example, as a result of movement from the service area of the wireless office environment type private cellular telephone system 40 into the service area of the public access cellular telephone system 12 (as illustrated by arrow 68), an inter-exchange hand off of the call occurs from the mobile switching center 42 to the mobile switching center 14. Conversely, as a result of movement from the service area of the public access cellular telephone system 12 into the service area of the wireless office environment type private cellular telephone system 40 (as illustrated by arrow 70), an inter-exchange hand off of the call occurs from the mobile switching center 14 to the mobile switching center 42.

Figure 2:
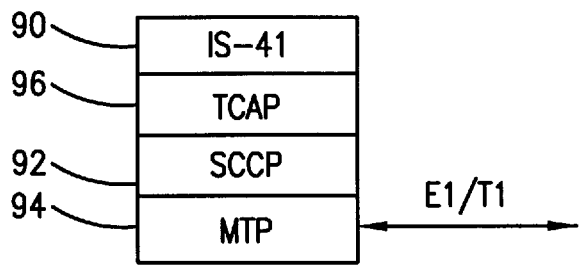
FIG. 2 illustrates the use of signaling system no. 7 (SS7) messaging protocols to transport IS-41 messages over an E1/T1 connection.

In a conventional cellular communications system, this inter-exchange hand off is accomplished through the exchange of IS-41 (or other SS7) messages 90 between the anchor and serving mobile switching centers using well known signaling system no. 7 (SS7) messaging protocols as illustrated in FIG. 2. In this configuration, the Signaling Connection Control Part (SCCP) layer 92 is used with the Message Transfer Part (MTP) layer 94 to route Transaction Capability Application Part (TCAP) layer 96 formatted IS-41 (or other SS7) messages 90 from end to end.

Figure 3:
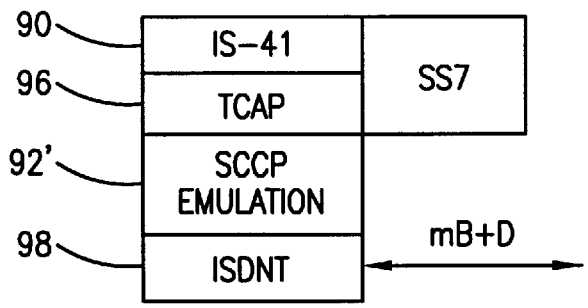
FIG. 3 illustrates the use of the messaging protocols of the present invention to transport IS-41 (and other SS7) messages over an ISDN connection.

The integrated services digital network 62 is not, however, capable of providing a transport medium for IS-41 messages in accordance with the signaling system no. 7 (SS7) messaging protocols. The SCCP layer 92 and the MTP layer 94 thus cannot be used for end to end routing of the TCAP layer 96 formatted IS-41 (or other SS7) messages 90 over an mB+D ISDN connection (where m=2, 23 or 30). In accordance with the present invention, as illustrated in FIG. 3, a Signaling Connection Control Part Emulation (SCCPE) layer 92' is used with an ISDN Transport (ISDNT) layer 98 to route Transaction Capability Application Part (TCAP) layer 96 formatted IS-41 messages 90 from end to end through the integrated services digital network 62 over the mB+D ISDN connection. The SCCPE layer 92' emulates the primitives offered by the SCCP layer 92 and functions, with the ISDNT layer 98, to encapsulate TCAP layer 96 messages within ISDN packets for transmission over the D channel.

Although the present invention has been disclosed herein in the context of supporting the transmission of IS-41 messaging over an ISDN connection (see, FIG. 3), it will, of course, be understood that the protocol converter 72 (comprising the SCCP emulation layer 92' and ISDNT layer 98) supports the communication over the ISDN connection of any SCCP supported signaling system no. 7 based messaging (including, but not necessarily limited to, Intelligent Network Application Part (INAP) messaging and Mobile Application Part (MAP) messaging). It will further be understood that the present invention allows for the support of all other IS-41 procedures (for example, authentication).

Reference is now again made to FIG. 1. To implement the foregoing, the SCCPE layer 92' and ISDNT layer 98 together comprise a protocol conversion functionality 72 that is installed in each of the cooperating mobile switching center 14(2) (PLMN-MSC), the home location register (PLMN-HLR) 22, and the wireless office environment mobile switching center (WOE-MSC) 42 to enable IS-41 (or other SS7 based) message transport over the D channel of the mB+D ISDN connections 64 and 66 (where m=2, 23, or 30). Voice communications, where necessary, are transported over one of the m available B channels of the mB+D ISDN connections 64 and 66. Furthermore, in support of the making of ISDN connections between the public access cellular telephone system 12 and the wireless office environment type private cellular telephone system 40, each of the cooperating mobile switching center 14(2) (PLMN-MSC), the home location register (PLMN-HLR) 22, and the wireless office environment mobile switching center (WOE-MSC) 42 are assigned an ISDN address comprising a directory telephone number. These ISDN addresses are used by the protocol conversion functionality 72 (in place of origination and destination point codes as used in FIG. 2 SS7 messaging) to address information packets for transmission through the integrated services digital network 62. When necessary, a conversion table is maintained by the cooperating mobile switching center 14(2) (PLMN-MSC), the home location register (PLI-HLR) 22, or the wireless office environment mobile switching center (WOE-MSC) 42 to translate a destination point code for a particular node in either the public access cellular telephone system 12 or the wireless office environment type private cellular telephone system 40 to its corresponding assigned ISDN address.

Figure 4:
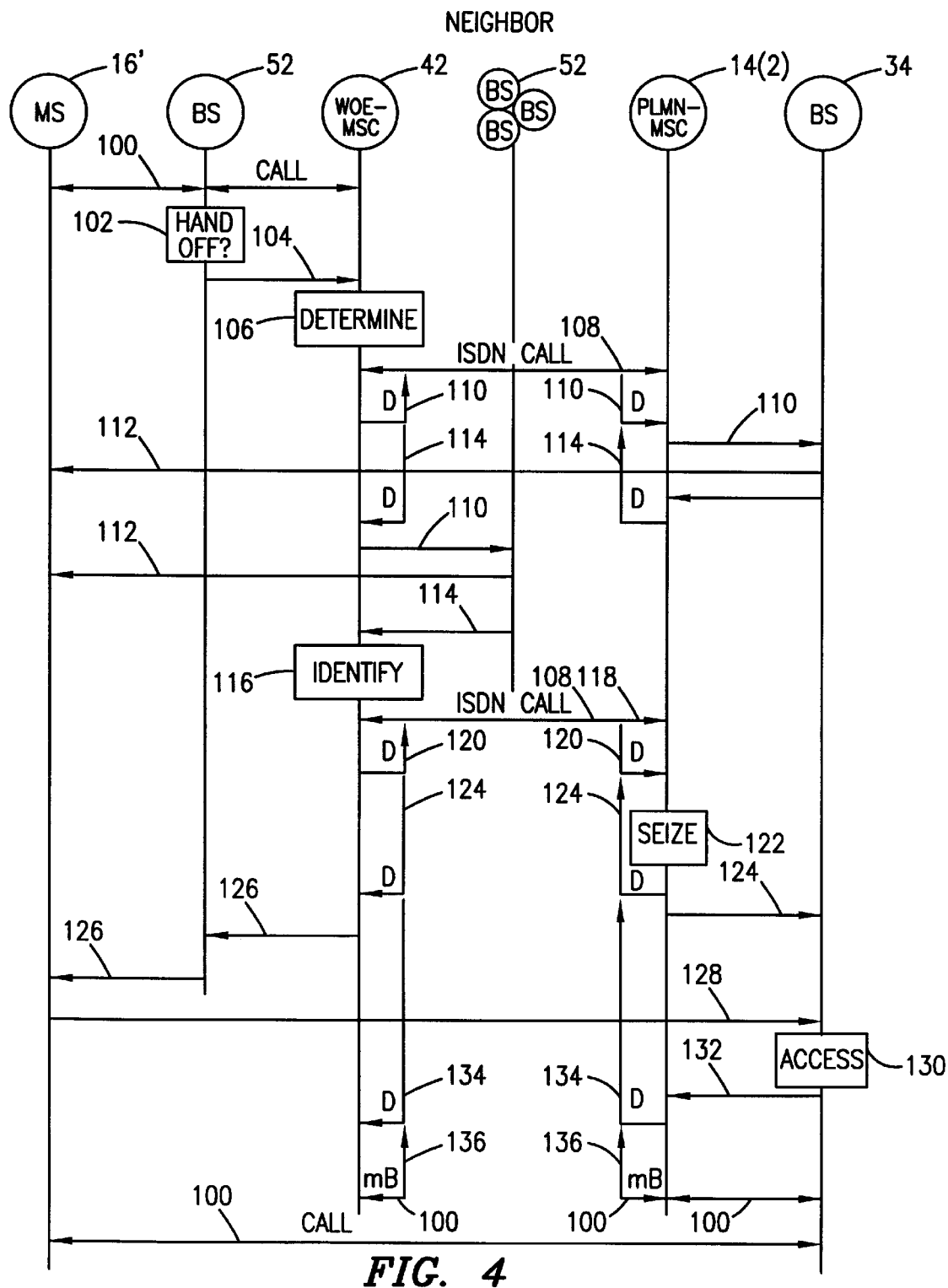
FIG. 4 is a signal flow and node operation diagram illustrating an inter-exchange hand off of a communication from the wireless office environment type private cellular telephone system to the public access cellular telephone system.

Reference is now made to FIGS. 1 and 4. FIG. 4 is a flow diagram illustrating the hand off of a mobile station 16' from the wireless office environment type private cellular telephone system 40 to the public access cellular telephone system 12 (see, arrow 68). An ongoing call communication 100 is being carried by one selected traffic channel through base station 52. Through monitoring of signal strength measurements made by either the base station 52 (on the uplink) and/or the mobile station 16' (on the downlink), the base station determines whether a hand off is necessary. (action 102) due to decreasing signal strength characteristics over the air interface 36 carrying the communication 100. If the determination is affirmative, the base station 52 transmits a hand off request 104 to its mobile switching center (WOE-MSC) 42.

Responsive to the request, the mobile switching center 42 determines where the hand off could and/or should preferably occur (action 106). This determination is made by identifying neighboring cells to the currently serving cell, and perhaps evaluating any downlink signal strength measurements made with respect to those cells by the mobile station 16'. In the present hand off situation, the identified neighboring cells include cells within the wireless office environment type private cellular telephone system 40 (served by other base stations 52) and at least one cell within the public access cellular telephone system 12 (served by a base station 34).

Because a cell within the public access cellular telephone system 12 is identified as a hand off candidate, the mobile switching center 42 establishes a call connection 108 with the cooperating mobile switching center (PLMN-MSC) 14(2) of the public access cellular telephone system. Using the D channel of the mB+D connections. 64 and 66 as well as the protocol converters 72, the two mobile switching centers 14(2) and 42 exchange the requisite IS-41 (or other SS7) signaling relating to the making of a verification signal strength measurement by the base station 34. This signaling includes a request 110, sent by the mobile switching center 42, for a verification signal strength measurement 112 to be made by the base station 34, as well as a report 114, sent by the mobile switching center 14(2), on the base station made measurement. The call connection 108 may at this point be dropped, if desired.

At the same time, the mobile switching center 4 requests 110 the making of a verification signal strength measurement 112 by each of the base stations 52 for the identified candidate cells within the wireless office environment type private cellular telephone system 40. The reports 114 on the base station 52 made verification signal strength measurements are then subsequently received.

By processing all of the reported 114 signal strength measurements, the mobile switching center 42 identifies (action 116) a preferred target cell for hand off. It is assumed for purposes of this example, that the mobile switching center 42 identifies a cell associated with base station 34 within the public access cellular telephone system 12 as the preferred target. If the call connection 108 is not still in place, the mobile switching center 42 establishes a new call connection 118 with the cooperating mobile switching center 14(2) of the public access cellular telephone system. Otherwise, the existing call connection 108 is used. Using the D channel of the mB+D connections 64 and 66, the two mobile switching centers 14(2) and 42 then exchange the requisite IS-41 (or other SS7) signaling for effectuating the hand off. This signaling includes a request 120, made by the mobile switching center 42, for the assignment (and reservation), by the mobile switching center 14(2), of a traffic channel for hand-off to the target cell (served by base station 34). A traffic channel is then seized (action 122), and both the base station 34 and mobile switching center 42 are informed 124 of the assignment by the mobile switching center 14(2) as to the traffic channel in the target cell. The mobile switching center 42 then signals 126 the mobile station 16' via the base station 52 for the currently serving cell with a handover command directing the mobile station to switch to the assigned traffic channel in the target cell. The mobile station 16' then tunes to and accesses 128 the assigned traffic channel. When the base station 34 detects the mobile station access (action 130), the mobile switching center 14(2) is informed 132. A signal 134 indicative of the same is then sent by the mobile switching center 14(2) to the mobile switching center 42 over the D channel of the mB+D connections 64 and 66. The call communication 100 is then switched 136 to the mobile switching center 14(2) over one of the m available B channels of the mB+D connections 64 and 66 providing call connection 108 or 118 for further handling to complete the hand-off procedure.

Figure 5:
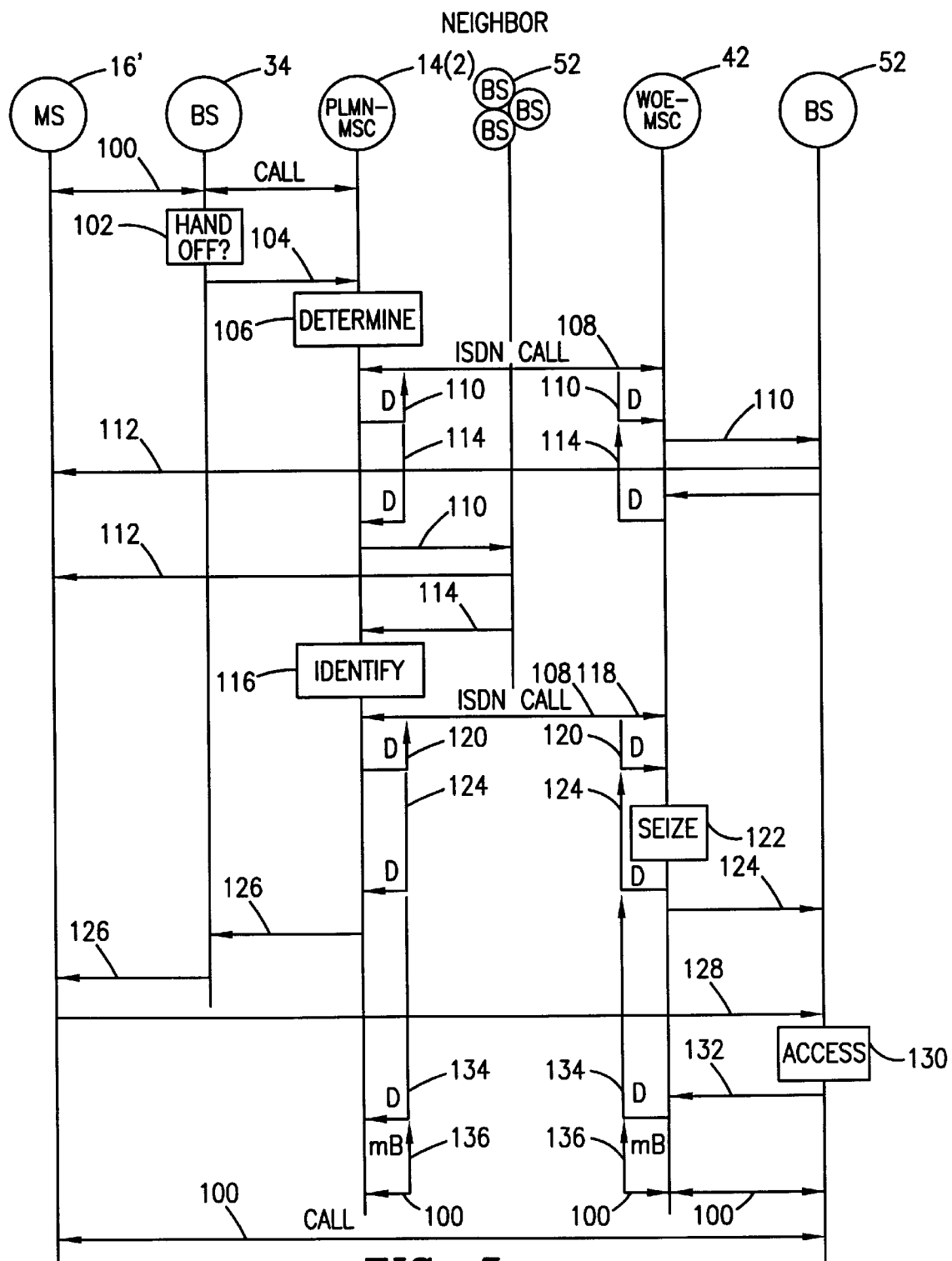
FIG. 5 is a signal flow and node operation diagram illustrating an inter-exchange hand off of a communication from the public access cellular telephone system to the wireless office environment type private cellular telephone system.

Reference is now made to FIGS. 1 and 5. FIG. 5 is a flow diagram illustrating the hand off of a mobile station 16' from the public access cellular telephone system 12 to the wireless office environment type private cellular telephone system 40 (see, arrow 70). An ongoing call communication 100 is being carried by one selected traffic channel through base station 34. Through monitoring of signal strength measurements made by either the base station 34 (on the uplink) and/or the mobile station 16' (on the downlink), the base station determines whether a hand off is necessary (action 102) due to decreasing signal strength characteristics over the air interface 36 carrying the communication 100. If the determination is affirmative, the base station 34 transmits a hand off request 104 to its mobile switching center (PLMN-MSC) 14(2).

Responsive to the request, the mobile switching center 14(2) determines where the hand off could and/or should preferably occur (action 106). This determination is made by identifying neighboring cells to the currently serving cell, and perhaps evaluating any downlink signal strength measurements made with respect to those cells by the mobile station 16'. In the present hand off situation, the identified neighboring cells include cells within the public access cellular telephone system 12 (served by other base stations 34) and at least one cell within the wireless office environment type private cellular telephone system 40 (served by a base station 52).

Because a cell within the wireless office environment type private cellular telephone system 40 is identified as a hand off candidate, the mobile switching center 14(2) establishes a call connection 108 with the cooperating mobile switching center (WOE-MSC) 42 of the wireless office environment type private cellular telephone system. Using the D channel of the mB+D connections 64 and 66 as well as the protocol converters 72, the two mobile switching centers 14(2) and 42 exchange the requisite IS-41 (or other SS7) signaling relating to the making of a verification signal strength measurement by the base station 52. This signaling includes a request 110, sent by the mobile switching center 14(2), for a verification signal strength measurement 112 to be made by the base station 52, as well as a report 114, sent by the mobile switching center 42, on the base station made measurement. The call connection 108 may at this point be dropped, if desired.

At the same time, the mobile switching center 14(2) requests 110 the making of a verification signal strength measurement 112 by each of the base stations 34 for the identified candidate cells within the public access cellular telephone system 12. The reports 114 on the base station 34 made verification signal strength measurement are then subsequently received.

By processing all of the reported 114 signal strength measurements, the mobile switching center 14(2) identifies (action 116) a preferred target cell for hand off. It is assumed for purposes of this example, that the mobile switching center 14(2) identifies a cell associated with base station 52 within the wireless office environment type private cellular telephone system 40 as the preferred target. If the call connection 108 is not still in place, the mobile switching center 14(2) establishes a new call connection 118 with the cooperating mobile switching center 42 of the wireless office environment type private cellular telephone system. Otherwise, the existing call connection 108 is used. Using the D channel of the mB+D connections 64 and 66, the two mobile switching centers 14(2) and 4, then exchange the requisite IS-41 (or other SS7) signaling for effectuating the hand off. This signaling includes a request 120, made by the mobile switching center 14(2), for the assignment (and reservation), by the mobile switching center 42, of a traffic channel for hand-off to the target cell (served by base station 52). A traffic channel id then seized (action 122), and both the base station 52 and mobile switching center 14(2) are informed 124 of the assignment by the mobile switching center 42 as to the traffic channel in the target cell. The mobile switching center 14(2) then signals 126 the mobile station 16' via the base station 34 for the currently serving cell with handover command directing the mobile station to switch to the assigned traffic channel in the target cell. The mobile station 16' then tunes to and accesses 128 the assigned traffic channel. When the base station 52 detects the mobile station access (action 130), the mobile switching center 42 is informed 132. A signal 134 indicative of the same is then sent by the mobile switching center 42 to the mobile switching center 14(2) over the D channel of the mB+D connections 64 and 66. The call communication 100 is then switched 136 to the mobile switching center 42 over one of the m available B channel of the mB+D connections 64 and 66 providing call connection 108 or 118 for further handling to complete the hand-off procedure.

Figure 6A:
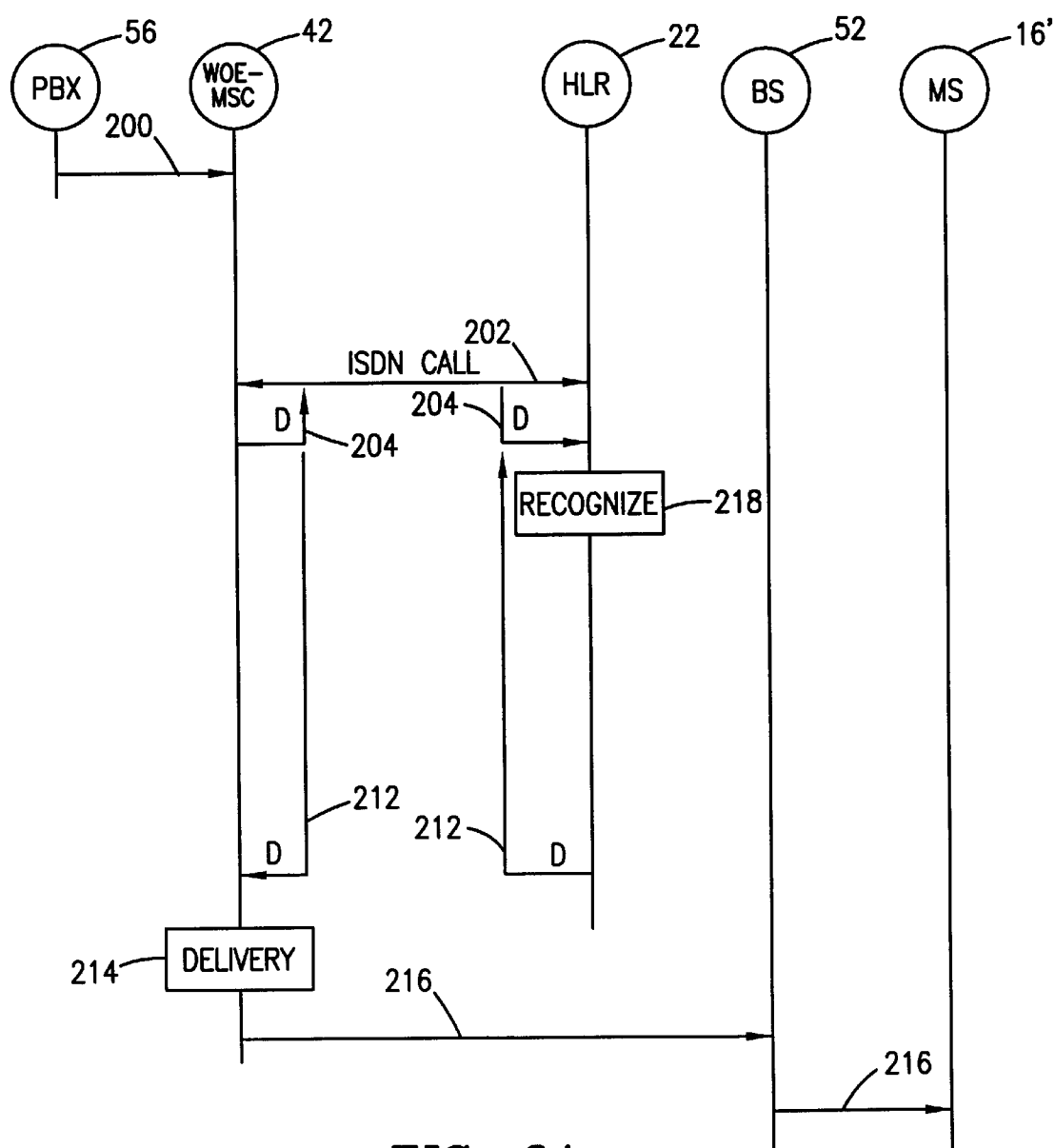
FIGS. 6A and 6B are signal flow and node operation diagrams illustrating the termination of an incoming call.
Figure 6B:
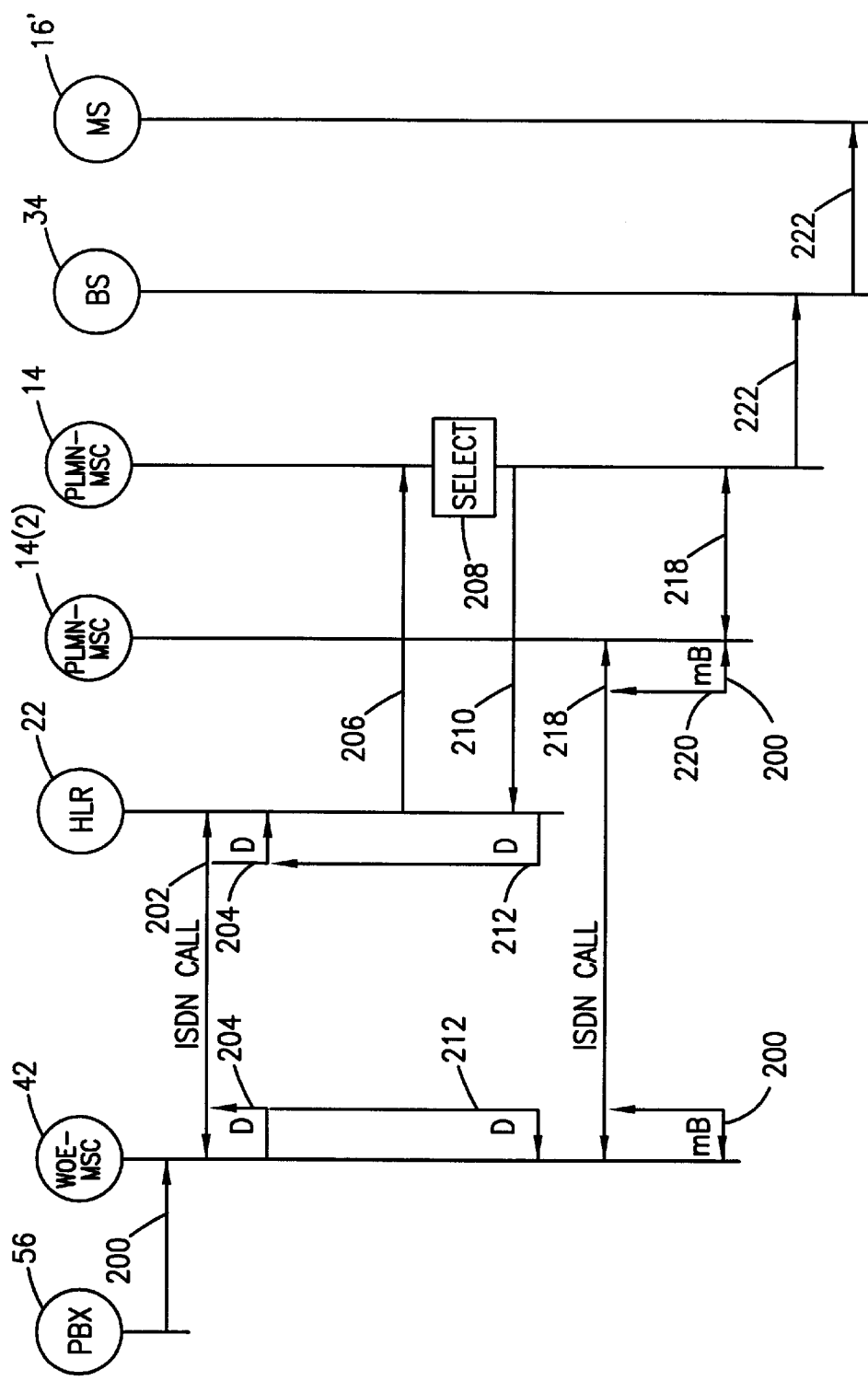

Reference is now made in combination to FIGS. 1 and 6A and 6B. FIGS. 6A and 6B are signal flow and node operation diagrams for the termination of an incoming call. A call 200 dialed to the directory number (B-number) of a mobile station 16' originates from the private branch exchange 56 and is received at the mobile switching center (WOE-MSC) 42. Using the integrated services digital network 62, the mobile switching center 42 establishes a call connection 202 with the home location register (PLMN-HLR) 22. Using the D channel of the mB+D connections 64 and 66, the mobile switching center 42 interrogates the home location register data base 20 with a location request (send routing) message 204. The location request (send routing) message 204 is processed by the home location register 22 to determine the location (i.e., serving mobile switching center) of the called mobile station 16'. The determined serving mobile switching center may comprise the mobile switching center (WOE-MSC) 42 (see, FIG. 6A) or one of the mobile switching centers (PLMN-MSC) 14 (see, FIG. 6B).

Turning now to FIG. 6A, the home location register 22 then recognizes (action 218) from the location processing that the mobile switching center 42 is functioning as both the gateway switch for the call as well as the serving switching node for the called mobile station 16' with respect to the incoming call 200. A message 212 is then sent to the originating mobile switching center 42 over the D channel of the mB+D connections 64 and 66 from the home location register 22 with a result code indicating the foregoing. Accordingly, no temporary location directory number (TLDN) need be assigned in this case. The incoming call is then delivered (through connected) 214 using the routing number to the serving mobile switching center 42 for attempted completion to the called mobile station 16 . Completion of the call involves further routing 216 the incoming call to the currently serving base station 52, and then to the called mobile station 16' over the air interface 36.

Turning now to FIG. 6B, the home location register 22 signals the serving mobile switching center 14 for the called mobile station 16' over signaling link 24 with a routing request (provide roaming) message 206 to prepare for the call. The serving mobile switching center 14 then selects in action 208 an appropriate routing number (for example, a temporary location directory number (TLDN) or a roaming number). The selected routing number is then returned 210 and 212 to the originating mobile switching center 42 over the signaling link 24 and D channel of the mB+D connections 64 and 66 via the home location register 22. Using the integrated services digital network 62, the mobile switching center 42 establishes a call connection 218 with the cooperating mobile switching center 14(2) which is extended, if necessary to the serving mobile switching center 14 via trunk 18 and signaling link 20. The incoming call is then delivered (through connected) 220 over one of the m available B channels of the mB+D connections 64 and 66 and the voice trunk 18 using the routing number to the serving mobile switching center 14 for attempted completion to the called mobile station 16'. Completion of the call involves further routing 222 the incoming call to the currently serving base station 34, and then to the called mobile station 16' over the air interface 36. Updating storage (action 310) of relevant data is further performed in the home location register 22.

Figure 7:
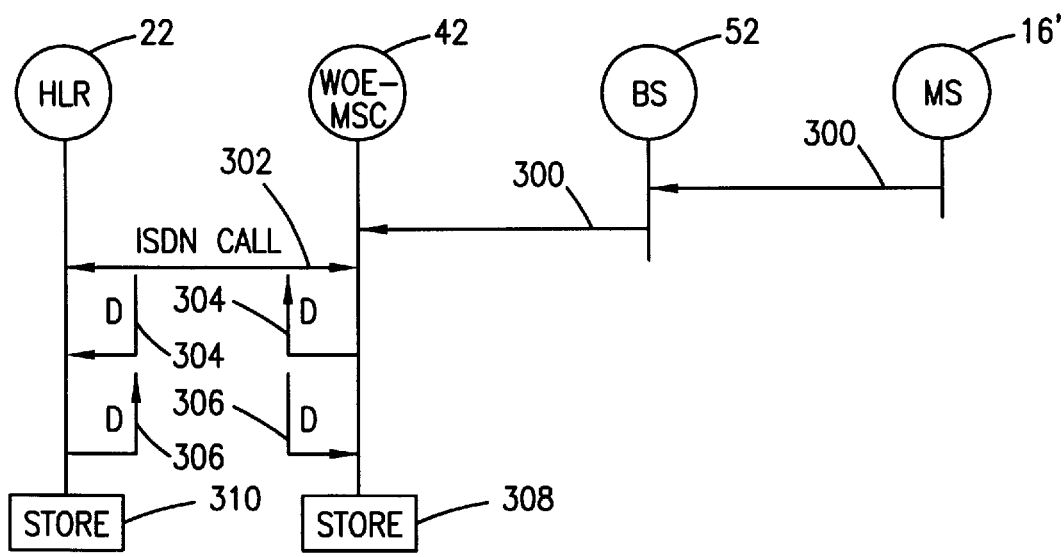
FIG. 7 is a signal flow and node operation diagram illustrating registration of a mobile station.

Reference is now made to FIGS. 1 and 7. FIG. 7 is a signal flow and node operation diagram illustrating registration of a mobile station. A mobile station 16' makes a registration with the system 10 by transmitting a registration message 300 to the serving mobile switching center (WOE-MSC) 42 through the serving base station 52 (and perhaps the serving base station controller 46). Responsive thereto, the mobile switching center 42 establishes a call connection 302 with the home location register (PLMN-HLR) 22. Using the D channel of the mB+D connections 64 and 66, the mobile switching center 42 sends a registration notification message 304 to the home location register 22 requesting the subscriber profile associated with the registering mobile station 16'. The home location register 22 retrieves the subscriber profile and sends that information back to the requesting mobile switching center 42 in a message 306 transmitted back over the D channel of the mB+D connections 64 and 66. The subscriber profile is then stored (action 308) in a visitor location register (not shown) associated with the serving mobile switching center 42.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A wireless communications system comprising:
   a private cellular telephone system providing service only to first mobile stations, the private cellular telephone system including a first switching node connected to a plurality of first base stations in radio frequency communication with the first mobile stations;
   a public cellular telephone system providing service to second mobile stations, the second mobile stations including at least one first mobile station, the public cellular telephone system including a second switching node connected to a plurality of second base stations in radio frequency communication with the second mobile stations and the at least one first mobile station, the second switching node further connected to a home location register;
   an integrated services digital network interconnecting the first switching node, the second switching node and the home location register for carrying reformatted signaling system no. 7 message communication including:
      a first mB+D connection with the first mobile switching center;
      a second mB+D connection with the second mobile switching center; and
      a third mB+D connection with the home location register;
   a first protocol converter for the first switching node connected to the first mB+D connection to provide a Signaling Connection Control Part (SCCP) emulation functionality for formatting signaling system no. 7 messages for communication to and from the second switching node and home location resister over the integrated services digital network;
   a second protocol converter for the second switching node connected to the second mB+D connection to provide an SCCP emulation functionality for formatting signaling system no. 7 messages for communication to and from the first switching node and home location register over the integrated services digital network; and
   a third protocol converter for the home locating register connected to the third mB+D connection to provide an SCCP emulation functionality for formatting signaling system no. 7 messages for communication to and from the first and second switching nodes over the integrated services digital network.

2. The system as in claim 1 wherein m=2, 23 or 30.

3. The system as in claim 1 wherein the first, second and third mB+D connections include a D channel, and wherein the D channel is used to carry protocol converter formatted signaling system no. 7 messages among and between the first and second mobile switching centers and the home location register.

4. The system as in claim 3 wherein the routed signaling system no. 7 messages comprise hand off signaling messages.

5. The system as in claim 3 wherein the routed signaling system no. 7 messages comprise call delivery signaling messages.

6. The system as in claim 3 wherein the routed signaling system no. 7 messages comprise first mobile station registration signaling messages.

7. The system as in claim 1 wherein the first and second mB+D connections include m available B channels, and wherein each B channel may be used to carry voice communications between the first and second mobile switching centers.

8. A method for communicating signaling system no. 7 messages over an integrated services digital network from a first communications switching node to a second communications switching node, comprising the steps of:
   establishing an integrated services digital network call connection between the first and second communications switching nodes;
   converting at the first communications switching node an originated signaling system no. 7 message to a format suitable for transmission over a D channel of the established integrated services digital network call connection;
   sending the converted message over the D channel to the second communications switching node; and
   converting at the second communications switching nod the sent converted message format received from the channel back to the originated signaling system no. 7 message.

9. The method as in claim 8 wherein the first communications switching node comprises a first cellular system switching node and the second communications switching node comprises a second cellular system switching node, and the signaling system no. 7 message comprises a cellular call delivery signaling message.

10. The method as in claim 8 wherein the first communications switching node comprises a first cellular system switching node and the second communications switching node comprises a second cellular system switching node, and the signaling system no. 7 message comprises a cellular hand off signaling message.

11. The method as in claim 8 wherein the first communications switching node comprises a cellular system switching node and the second communication switching node comprises a home location register, and the signaling system no. 7 message comprises a cellular call delivery signaling message.

12. The method as in claim 11 wherein the first communications switching node comprises a cellular system switching node and the second communications switching node comprises a home location register, and the signaling system no. 7 message comprises a mobile station registration message.

13. A method for performing a hand off of a mobile station call from a first cellular communications system to a second cellular communications system wherein the first and second cellular communications systems are interconnected by an integrated services digital network, comprising the steps of:
   establishing an integrated services digital network call connection between communications switches of the first and second cellular communications systems;
   exchanging signaling system no. 7 based hand off signaling messages between the communications switches of the first and second cellular communications systems via converted hand off signaling message transmissions over D channel of the established integrated services digital network call connection; and
   routing the mobile station call between communications switches of the first and second cellular communications systems over a B channel of the established integrated services digital network call connection to effectuate hard.

14. The method as in claim 13 further including the steps of:
   converting at one of the communications switches fit the first or second cellular communications systems a signaling system no. 7 hand off related message to a format for transmission over the D channel of the established integrated services digital network call connection;

sending the converted message over the D channel; and converting at the other of the communications switches of the first or second cellular communications systems the converted message format back to the signaling system no. 7 hand off related message.

15. The method as in claim 13 wherein the signaling system no. 7 based hand off signaling messages comprise verification signal strength measurement requests.

16. The method as in claim 13 wherein the signaling system no. 7 based hand off signaling messages comprise channel assignment requests.

17. The method as in claim 13 wherein the signaling system no. 7 based hand off signaling messages comprise mobile station access reports.

18. A method for delivering an incoming call received at a communications switch of a first cellular communications system to mobile station served by a communications switch of a second cellular communications system wherein the communications switches of the first and second cellular communications systems are interconnected by an integrated services digital network, comprising the steps of:

establishing an integrated services digital network call connection between the communications switches of a first and second cellular communications systems;

exchanging signaling system no. 7 based call delivery signaling messages between the communications switches of the first and second cellular communications systems via converted call delivery signaling message transmissions over a D channel of the established integrated services digital network call connection; and routing the incoming call between the communications switches of the first and second cellular communications systems over a B channel of the established integrated services digital network call connection for delivery to the mobile station by the second cellular communications system.

19. The method as in claim 18 further including the steps of:

converting at one of the communications switches for the first or second cellular communications systems a signaling system no. 7 call delivery related message to a format for transmission over the D channel of the established integrated services digital network call connection;

sending the converted message over the D channel; and converting at the other of the communications switches for the first or second cellular communications systems the converted message format back to the signaling system no. 7 call delivery related message.

20. The method as in claim 18 wherein the signaling system no. 7 based call delivery signaling messages comprise mobile station location requests.

21. The method as in claim 18 wherein the signaling system no. 7 based call delivery signaling messages comprise call routing requests.

22. A method for registering a mobile station served by a communications switch of a first cellular communications system with a home location register of a second cellular communications system wherein the communications switch and home location register of the first and second cellular communications systems, respectively, are interconnected by an integrated services digital network, comprising the steps of:

establishing an integrated services digital network call connection between the communications switch and home location register of the first and second cellular communications systems; and exchanging signaling system no. 7 based registration signaling messages between the communications switch and home location register of the first and second cellular communications systems via converted registration signaling message transmissions over a D channel of the established integrated services digital network call connection to register the mobile station in the home location register.

23. The method as in claim 22 further including the steps of:

converting at one of the communications switch or home location register of the first or second cellular communications systems a signaling system no. 7 registration related message to a format for transmission over the D channel of the established integrated services digital network call connection;

sending the converted message over the D channel; and converting at the other of the communications switch or home location register of the first or second cellular communications systems the converted message format back to the signaling system no. 7 registration related message.

24. The method as in claim 22 wherein the signaling system no. 7 based registration signaling messages comprise registration notification messages.

25. The method as in claim 22 wherein the signaling system no. 7 based registration signaling messages comprise subscriber profile information.

* * * * *

UNITED STATES PATENT AND TRADEMARK OFFICE
CERTIFICATE OF CORRECTION

PATENT NO. : 5,771,275
DATED : Jun. 23, 1998
INVENTOR(S) : Brunner et al.

It is certified that error appears in the above-identified patent and that said Letters Patent is hereby corrected as shown below:

TITLE PAGE:

| | |
|---|---|
| Item 57, line 9 | Replace "(PLNN-HLR)" With --(PLMN-HLR)-- |
| Column 1, line 31 | Replace "ox" With --or-- |
| Column 3, line 17 | Replace "(PLMN-MSCS)" With --(PLMN-MSCs)-- |
| Column 3, line 65 | Replace "illustrate" With --illustrated-- |
| Column 4, line 26 | Replace "a" With --at-- |
| Column 4, line 27 | Replace "leas" With --least-- |
| Column 4, line 45 | Replace "illustrate" With --illustrated-- |
| Column 5, line 53 | Replace "OF" With --of-- |

UNITED STATES PATENT AND TRADEMARK OFFICE
CERTIFICATE OF CORRECTION

PATENT NO. : 5,771,275
DATED : Jun. 23, 1998
INVENTOR(S) : Brunner et al.

It is certified that error appears in the above-identified patent and that said Letters Patent is hereby corrected as shown below:

| | |
|---|---|
| Column 6, line 64 | Replace "(PLI-HLR)" With --(PLMN-HLR)-- |
| Column 7, line 46 | Replace "4" With -- 42-- |
| Column 9, line 6 | Replace "measurement" With -- measurements-- |
| Column 9, line 20 | Replace "4," With --42,-- |
| Column 9, line 26 | Replace "id" With --is-- |
| Column 9, line 43 | Replace "channel" With --channels-- |
| Column 10, line 11 | Replace "16 ." With -- 16'.-- |
| Column 11, line 32 | Replace "resister" With -- register-- |

UNITED STATES PATENT AND TRADEMARK OFFICE
CERTIFICATE OF CORRECTION

PATENT NO. : 5,771,275
DATED : Jun. 23, 1998
INVENTOR(S) : Brunner et al.

It is certified that error appears in the above-identified patent and that said Letters Patent is hereby corrected as shown below:

Column 11, line 41     Replace "locating"
                           With --location--

Column 12, line 15     Replace "nod"
                           With --node--

Column 12, line 62     Replace "hard."
                           With --hand off.--

Column 12, line 65     Replace "fit"
                           With -- of--

Column 13, line 26     Replace "a"
                           With -- the--

Signed and Sealed this

Sixteenth Day of March, 1999

Attest:

Q. TODD DICKINSON

Attesting Officer    Acting Commissioner of Patents and Trademarks